March 28, 1967  C. B. RICHEY  3,311,175
MULTIPURPOSE IMPLEMENT
Filed Jan. 21, 1965  4 Sheets-Sheet 1

INVENTOR
CLARENCE B. RICHEY
BY
Tweedale & Gerhardt
ATTORNEYS.

March 28, 1967 C. B. RICHEY 3,311,175
MULTIPURPOSE IMPLEMENT
Filed Jan. 21, 1965 4 Sheets-Sheet 2

INVENTOR
CLARENCE B. RICHEY
BY Tweedale & Gerhardt
ATTORNEYS.

INVENTOR
CLARENCE B. RICHEY
BY Tweedale & Gerhardt
ATTORNEYS.

March 28, 1967    C. B. RICHEY    3,311,175
MULTIPURPOSE IMPLEMENT
Filed Jan. 21, 1965    4 Sheets-Sheet 4

INVENTOR
CLARENCE B. RICHEY
BY Tweedale & Gerhardt
ATTORNEYS.

United States Patent Office 3,311,175
Patented Mar. 28, 1967

3,311,175
MULTIPURPOSE IMPLEMENT
Clarence B. Richey, Fresno, Calif., assignor to
Massey-Ferguson Inc., Detroit, Mich.
Filed Jan. 21, 1965, Ser. No. 427,018
5 Claims. (Cl. 172—136)

This invention relates generally to multipurpose implements, and more particularly to multipurpose earthworking implements.

It has become common practice to combine a plurality of tools into a single implement so that the implement can perform a variety of operations on a workpiece or, in the earth working and construction industry, a variety of earthworking operations by alternately bringing the tools into operation as needed. Generally, the various tools of the combined implement are actuated independently between their operating and non-operating positions. With lighter tools, such actuation is usually accomplished manually, and in the case of heavier tools, such as in earthworking implements, the various tools are actuated into and out of their operating positions either manually by means of complex mechanical linkages, or by expensive hydraulic or other power systems. The operator generally must perform at least two separate operations in changing from one tool to the other; namely, he must first move one tool from its operating to non-operating position, and then actuate the desired tool from its non-operating to operating position, expending both time and exertion in the change over.

In earthworking implements of the type drawn by a tractor or similar draft vehicle, the operator frequently must dismount from the tractor to bring the various tools into operation, and the heavy implements require a great amount of exertion on his part.

An object of this invention is therefore to provide a multipurpose implement in which the tools are interconnected in such a manner that actuation of one tool between its operating and non-operating positions causes another tool to move between its operating and idle or non-operating positions in the same operation.

A further object is to provide a multipurpose implement in which actuation of one tool from an idle to working position with respect to a workpiece or the ground causes another tool to simultaneously move from one to the other of its idle and working positions.

A further object is to provide a multipurpose earthworking implement having a plurality of earthworking tools which are interconnected in such a manner that the raising and lowering of the implement with respect to the ground causes at least one of the tools to shift from one to the other of an operative and inoperative position.

Still another object is to provide a multipurpose earthworking implement adapted to be drawn by a tractor having a conventional hydraulic lift linkage in which the various tools of the implement can be shifted into and out of their earthworking or ground engaging positions merely by actuation of the tractor hydraulic system by the operator from the tractor seat.

Yet another object is to provide a multipurpose implement having a pair of tools each movable between operative and inoperative positions in which one of the tools is biased by its weight to assume one of its operative or inoperative positions when the implement is in a first position, and is biased by the other tool to assume the other of its operative and inoperative positions when the implement is in a second position such that movement of the implement between said first and second positions actuates the tools between their positions.

Yet another object is to provide a multipurpose implement including a scarifier-scraper adapted to be attached to a conventional, hydraulic three-point hitch of a tractor with the scraper and scarifier interconnected in such a manner that when the entire implement is raised above the ground by the tractor hydraulic system, the scraper is suspended between the scarifier and lift linkage such that its weight acts on the scarifier to bias it to an inoperative or idle position, and when the implement is lowered onto the ground by the tractor lift linkage, the weight of the scraper is removed from the scarifier and the weight of the scarifier causes it to move to a ground engaging operative or working position.

In carrying out the foregoing, and other objects, a multipurpose implement is provided having a pair of tools interconnected with an actuating mechanism operable to shift the entire implement, or one of the tools between a plurality of positions with respect to a workpiece or the ground. Each of the tools are movable between operative and inoperative positions. In one position of the implement, a first one of the tools is in an operative position, and in another position, the first tool is in an inoperative position with respect to the workpiece. The tools are interconnected with each other and the actuating mechanism such that the weight of the first tool acts on the second tool to cause the second tool to move from one position to another when the implement is moved by the actuating mechanism to one of its positions, and when the implement is moved to another position, the weight of the first tool is removed from the second tool, and the weight of the second tool causes it to return to its original position with respect to the first tool and the actuating mechanism.

In accordance with a preferred embodiment of the invention, the implement includes a combined scarifier and scraper adapted to be attached to, and actuated by the hydraulic lift linkage of a tractor having a three-point hitch of the well-known Ferguson type.

The scarifying tool of the implement is mounted on the lower draft links of the tractor for movement with respect to the lower links between a working, ground engaging position and an idle, inoperative position. The scarifying tool is mounted on the lower links in such a manner that it is biased by its weight to assume its working position. The scraper is connected at spaced points with the scarifying tool and the tractor linkage such that when the implement is raised above the ground by the hydraulic linkage of the tractor, the weight of the scraper acts on the scarifying tool to move it from its working position to its idle position, the weight of the scraper being greater than that of the scarifying tool.

When the implement is subsequently lowered onto the ground by the tractor hydraulic linkage, the scraper is supported on the ground and consequently, its weight no longer acts on the scarifying tool thereby permitting the scarifying tool to return to its working position. The scarifying tool may be locked in either position by a releasable latch accessible to the operator from the tractor seat permitting the scarifier to remain in either desired position during raising and lowering of the implement for scraping operations. In the working position of the scarifier, the scarifier teeth project beneath the scraper to engage and penetrate the ground for scarifying.

Preferably, the scarifying tool is pivotally mounted on the lower links, and the scraper is pivotally connected with the scarifying tool on an axis spaced from the pivotal axis between the scarifying tool and the lower links. The scraper is, in turn, connected with the linkage by means of a stabilizing link pivotally connected with the tractor links and slideably connected with the scraper. The scraper includes a double moldboard having front and rear scrapers alternately engageable with the ground upon forward and reverse movement, respectively, of the tractor as a result of the change in tilt automatically allowed by the lost motion of the stabilizer link.

Other objects, advantages and features of the invention will become apparent from the following description taken in connection with the accompanying drawings in which.

While a specific embodiment of the invention is illustrated and described in the foregoing specification, it should be understood that the invention is not limited to the exact construction shown. On the contrary, various alternatives, equivalents, and modifications in the construction and arrangement of parts is possible without departing from the scope and spirit of the invention.

Figure 1:
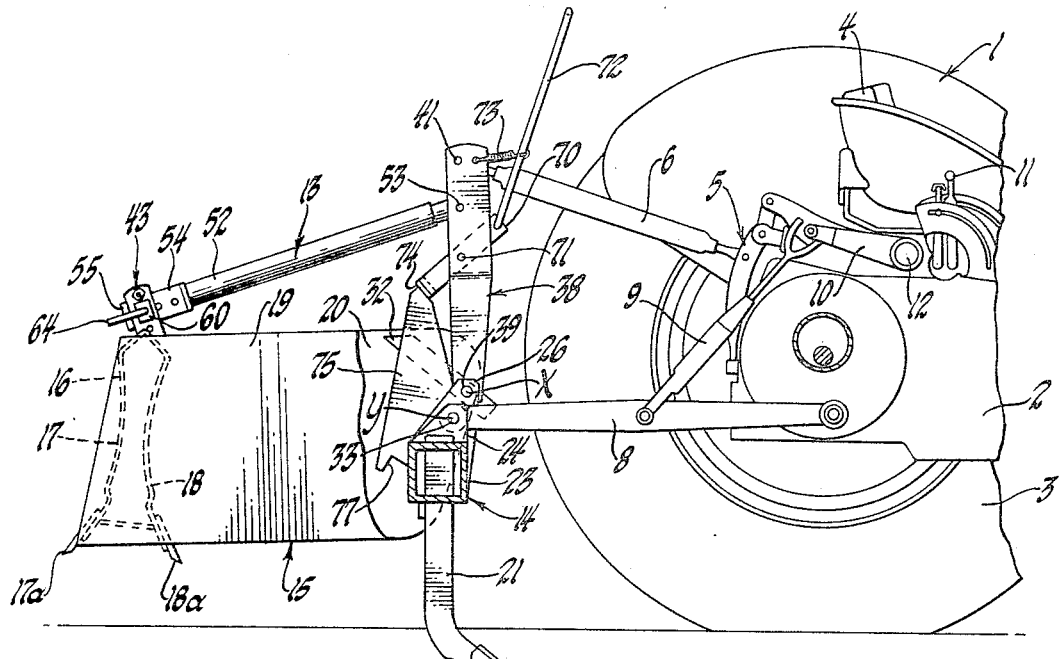
FIG. 1 is an elevational view, partially in section, of a tractor and a multipurpose implement embodying the invention.

In FIG. 1, reference numeral 1 designates collectively a tractor having a chassis 2, rear wheels 3 (only one of which is shown in the drawing), a seat 4 and hydraulic lift mechanism 5. The hydraulic lift mechanism 5 includes an upper link 6, lower links 8, and drop links 9 which extend between lower links 8 and a lift arm 10 mounted on a shaft 12 journalled in the tractor chassis. Actuation of control levers 11 causes lift arm 10 to rotate about the axis of shaft 12 to raise and lower the lower links 8 in a well known manner.

Mounted on the hydraulic lift mechanism 5 is a multipurpose implement indicated generally at 13 including a scarifying tool assembly 14 and a scraper assembly 15. The scraper assembly 15 includes a double moldboard 16 formed with a rear concave scraper 17 and a front concave scraper 18. Secured to the ends of the double moldboard 16 and extending forwardly therefrom is a pair of side panels 19 and 20. Triangular brace members 19a and 20a (FIG. 3) are welded between side panels 19 and 20, respectively, and moldboard 16 for strength and rigidity. The forwardly projecting side panels 19 and 20, together with the double moldboard 16 constitute a scraper bowl for retaining the dirt loosened by the scarifying tool and gathered by the forward scraper blade 18a.

The scarifying tool 14 includes a transverse hollow scarifier bar 23 of rectangular or square cross section in the illustrated embodiment which is slotted to receive the shanks 21 of scarifier teeth 22. Six such teeth and shanks are shown in the illustrated embodiment equally spaced along the length of scarifier bar 23. Shanks 21 are received in aligned slots in the upper and lower walls of scarifier bar 23 as viewed in FIG. 1.

Figure 3:
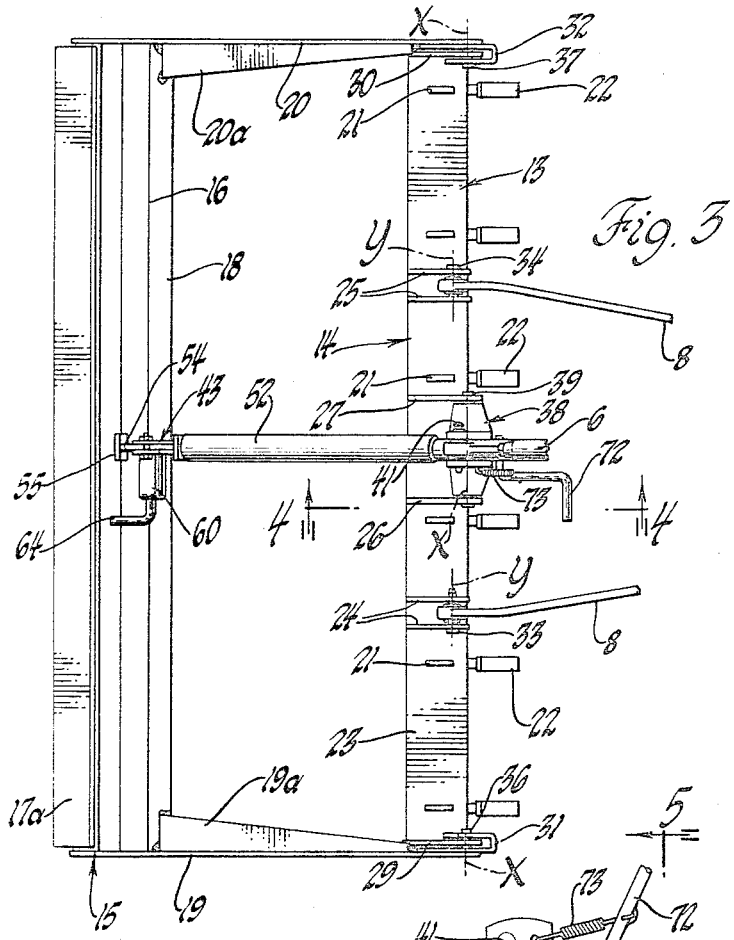
FIG. 3 is a plan view of the implement of FIG 1.
Figure 7:
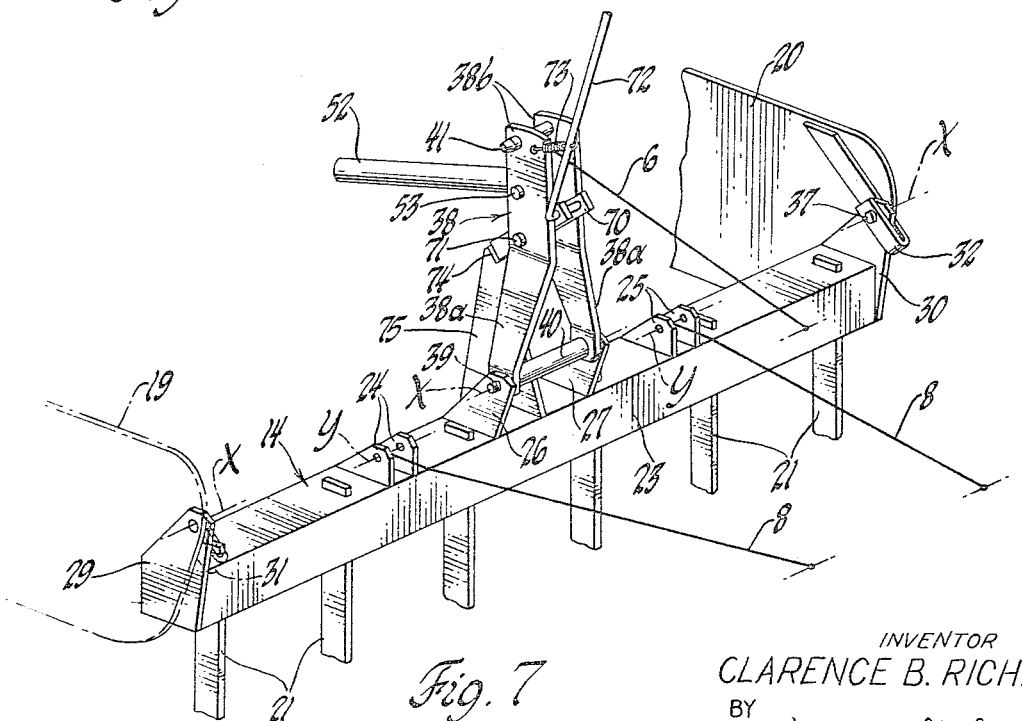
FIG. 7 is a perspective view of a portion of the implement.

Projecting upwardly from the top wall of scarifier bar 23 are two pairs of lugs 24 and 25 and a pair of upwardly projecting apertured ears 26 and 27 as best shown in FIGS. 3 and 7. Mounted on the ends of scarifier bar 23 is a pair of end plates 29 and 30 which project above the top wall of the scarifier bar and are apertured for connecting the scarifier bar with a pair of brackets 31 and 32 mounted on side plates 19 and 20, respectively, of the scraper. The lower links 8 of the tractor are pivotally connected with lugs 24 and 25 by means of pins 33 and 34, respectively, and the end plates 29 and 30 are pivotally attached to the reversely curved ends of brackets 31 and 32 by means of pins 36 and 37, respectively (FIG. 3).

Figure 5:
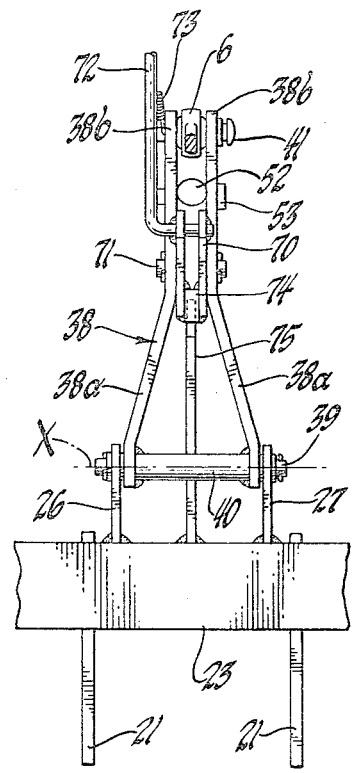
FIG. 5 is a detail view taken on line 5—5 of FIG. 4.

Pivotally mounted on the spaced, apertured ears 26 and 27 is a frame member 38 which is secured to ears 26 and 27 by means of a pin 39 extending between the spaced lower legs 38a of frame 38 and received in a spacer or sleeve member 40 disposed between the legs 38a. The upper link 6 of the tractor lift system is pivotally connected by a pin 41 between the upper legs 38b of frame 38 as shown in FIGS. 1, 5 and 7.

Pin 36, 37 and 39 are disposed in coaxial relationship to define a pivotal axis X—X, and pins 33 and 34 are disposed in coaxial relationship with respect to each other to define a pivotal axis Y—Y as indicated in FIGS. 3 and 7. Thus, the scarifying tool 14 is mounted on lower links 8 of the lift mechanism for pivotal movement about axis Y—Y, and the scraper 15 as well as frame 38 are connected with scarifier bar 23 for pivotal movement about axis X—X, the latter axis being spaced forwardly of axis Y—Y and disposed in parallel relationship therewith.

Figure 8:
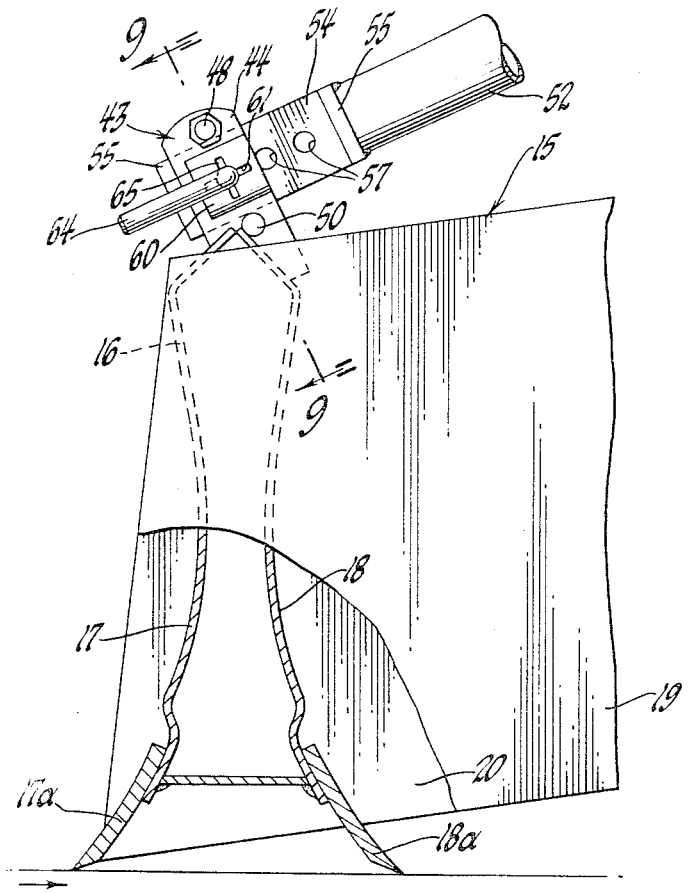
FIG. 8 is an enlarged detail of a portion of the implement.
Figure 9:
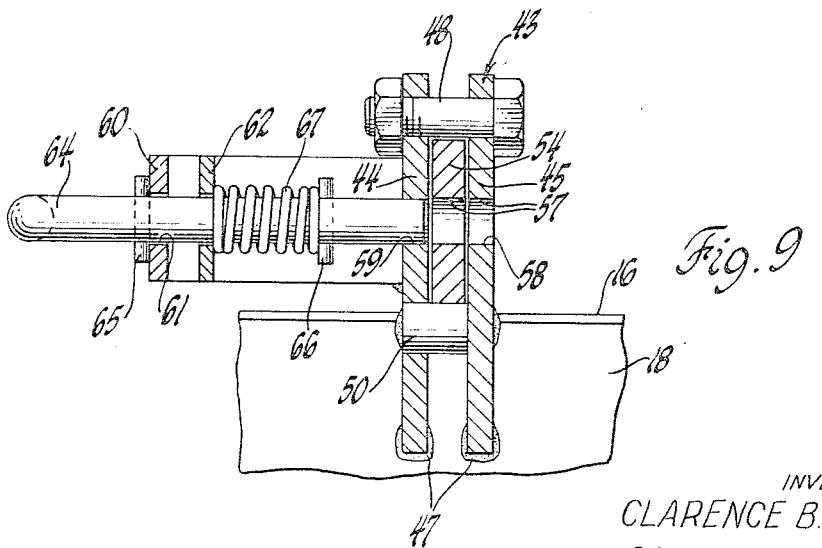
FIG. 9 is a sectional detail view taken on line 9—9 of FIG. 8.

With reference primarily to FIGS. 8 and 9, a guide bracket 43 projects upwardly from the upper edge of the double moldboard 16 substantially at its center. Guide bracket 43 is made up of a pair of spaced plates 44 and 45 which are welded at 47 to the moldboard 16. Mounted between plates 44 and 45 are upper and lower guide pins 48 and 50, respectively (FIG. 9).

Pivotally mounted by a pin 53 between the upper legs 38b of frame 38 (FIG. 5) is a brace or stabilizing link 52 having a guide bar 54 secured to its end opposite pin 53 (FIG. 8). Guide bar 54 is received between plates 44 and 45 in sliding relationship therewith and is formed at its opposite ends with a pair of laterally projecting stop plates 55 which cooperate with plates 44 and 45 to limit the movement of the guide bar 54 and stabilizing link 52 in bracket 43. Bar 54 is formed with a series, in this case three, of apertures 57 which may be selectively brought into registry with aligned apertures 58 and 59 in plate members 44 and 45, respectively (FIG. 9).

Welded onto plate member 45 is a U-shaped spring housing 60 having a key hole slot 61 formed in its outer end as shown most clearly in FIGS. 8 and 9. Extending between the legs of the U-shaped housing 60 is a spring abutment plate 62 which is apertured to receive a latch pin 64. The latch pin 64 is slideably mounted in key hole slot 61 and the aperture of spring support plate 62, and is formed with a transverse stop pin 65 adjacent its outer end for abutting against the end wall of housing 60. A laterally projecting spring support pin 66 is mounted on latch pin 64 near its opposite end for supporting one end of a spring 67, the other end of which is supported on plate 62.

Spring 67 biases latch pin 64 to extend into the aligned openings 58 and 59 in plates 44 and 45 when the latch pin is rotated 90 degrees from the position shown in FIGS. 8 and 9 to permit stop pin 65 to pass through key hole slot 61. Latch pin 64 may be retracted against the bias of spring 67 out of the path of guide bar 54 by rotating stop pin 65 out of alignment with the key hole slot 61 to the position shown permitting stabilizing link 52 to slide relative to plates 44 and 45 within the limits defined by stop plates 55. On the other hand, plate 54 may be selectively latched in one of three positions by bringing one of the apertures 57 into registry with apertures 58 and 59 and rotating latch pin 64 to permit stop pin 65 to pass through the key hole slot thereby permitting the latch pin to extend into apertures 57 and 58.

Figure 4:
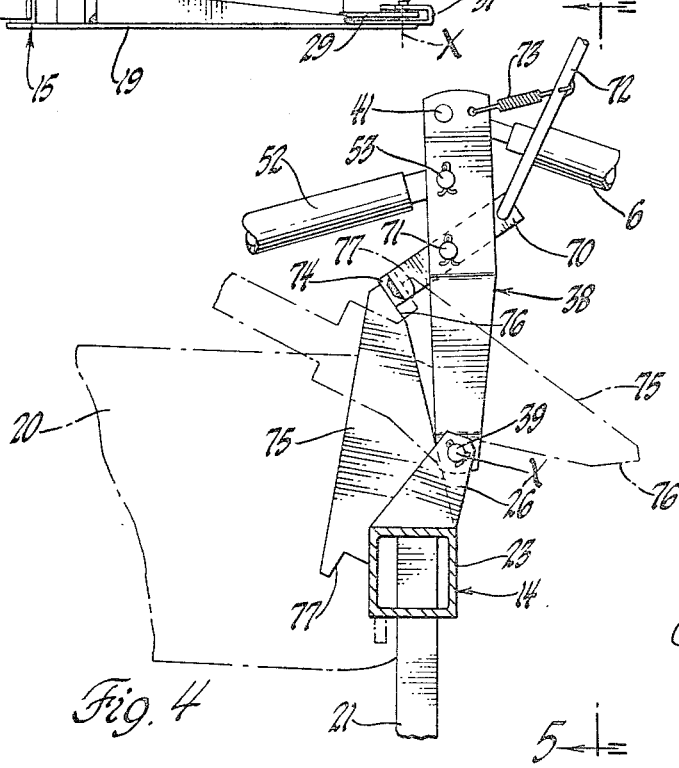
FIG. 4 is a sectional detail view taken on line 4—4 of FIG. 3.

With reference to FIGS. 4 and 5, a latch member 70 having an actuating arm or lever 72 welded to its forward end is pivotally mounted on frame 38 beneath pin 53. A spring 73 biases latch member 70 to rotate to its locking position about pin 71. Welded to scarifier bar 23 between the apertured ears 26 and 27 is a latch plate 75. Latch plate 75 is formed with a latching surface 76 for engagement with the end abutment 74 on latch member 70 when the scarifier assembly is in its operative or working position, and a latching notch 77 at its opposite end for engagement with abutment 74 when the scarifier assembly is in its inoperative or idle position as shown in FIG. 2 and in phantom lines in FIG. 4.

In FIG. 1, the scarifying tool is shown in its operative or working position in which the shanks 21 and teeth 22 project beneath the scraper bowl. In this position of the scarifier, the operator may lower the links 5 by manipulation of control levers 11 to lower the teeth 22 into ground engaging position for scarifying operation upon forward movement of the tractor. The scarifier is locked in position by engagement of latch plate 75 with latch member 70, and the scraper bowl 13 is suspended above the ground on pins 36 and 37 (FIGS. 3 and 7) and stabilizing link 52. Thus, a portion of the weight of scraper bowl 15 is carried by latch member 70 from pins 36, 37 through bar 23 and plate 75.

In the position of FIG. 1, axis X—X is located above and forward of axis Y—Y, the latter axis being held in fixed position by the action of hydraulic pressure on lower links 8. Since the upper link 6 is freely pivotal about its forward connection with the tractor, axis X—X is free to rotate in a clockwise direction about axis Y—Y except for the locking action of latch plate 75 and latch member 70. Moreover, the weight of scraper 15 acting on pins 36 and 37 tends to rotate axis X—X in a clockwise direction about axis Y—Y as viewed in FIG. 1.

Figure 2:
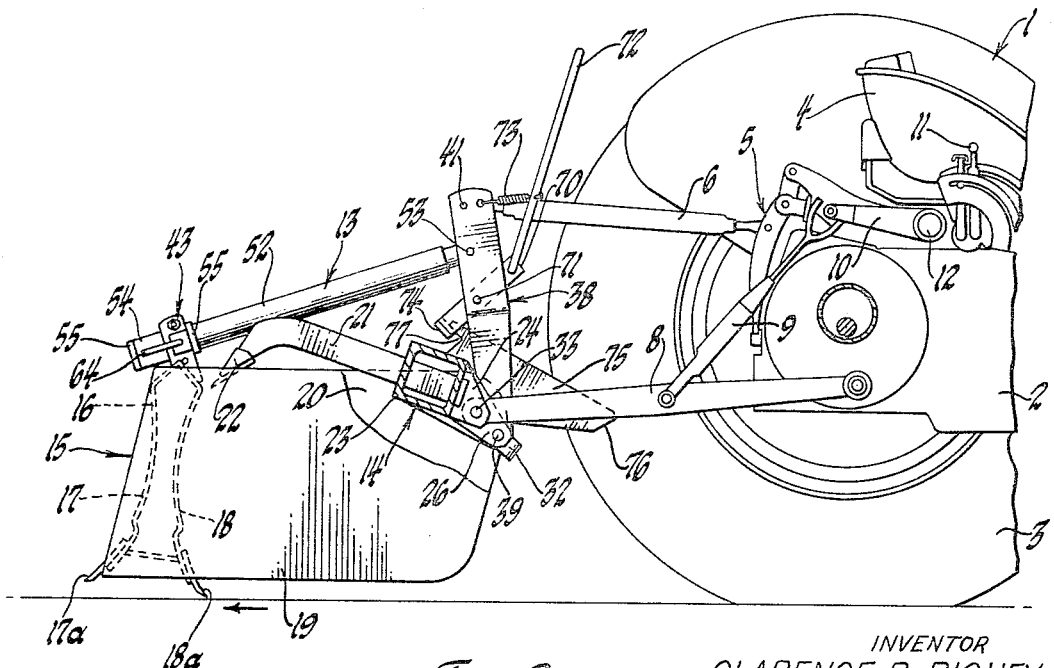
FIG. 2 is a view similar to FIG. 1 with the implement shown in an alternate position.
Figure 6:
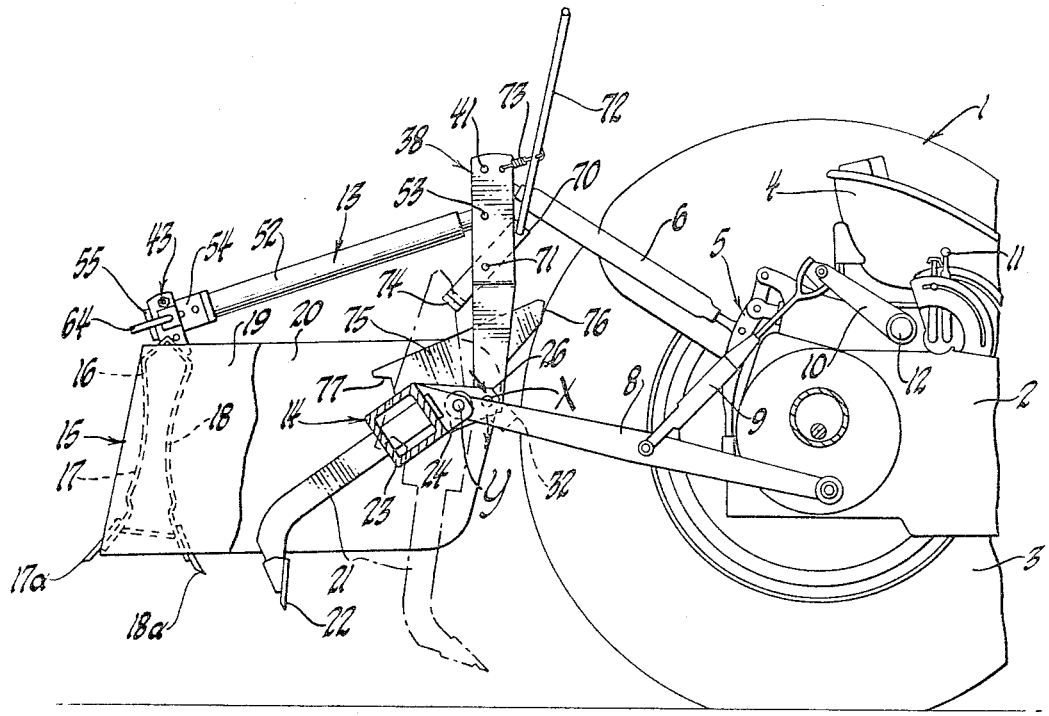
FIG. 6 is a view similar to FIGS. 1 and 2 with the implement shown in an intermediate position.

Therefore, in order to actuate scarifier 14 to its idle or inoperative position shown in FIG. 2 in which shanks 21 project rearwardly above the blades of scrapers 17 and 18, the operator pulls forwardly on lever 72 as viewed in FIG. 1 to rotate latch member 70 in a clockwise direction about pin 71 until it disengages from surface 76 of plate 75. Upon release of plate 75, the weight of scraper 15 causes pins 36, 37 and 39 to rotate in a clockwise direction about axis Y—Y of pins 33 and 34 as indicated by the arrows in FIG. 6 since the weight of scraper 15 supported on pins 36 and 37 is sufficient to overcome the weight of the scarifying tool 14 acting on the opposite side of axis Y—Y tending to resist clockwise movement of axis X—X. Consequently, scarifier bar 23 and shanks 22 swing upwardly and rearwardly to assume the idle position shown in FIG. 2. Spring 73 causes latching member 70 to return to its locking position, and plate 75 engages latching member 70 to cam the latching member into notch 77. The relative weights of scarifier 14 and scraper 15 may be such that the forces on the opposite sides of axis Y—Y of pins 33 and 34 are balanced when the scarifier is in the position shown in FIG. 2. In the illustrated embodiment, bar 23 stops against frame 38.

With the scarifying tool locked in its inoperative position, the scraper bowl 15 may be lowered onto the ground by the hydraulic linkage for scraping operations. With latch pin 64 in its retracted position of FIG. 9, bracket 43 "floats" along the length of guide bar 54. Consequently, upon forward movement of the tractor, the soil resistance causes the scraper to tilt upwardly about pins 36 and 37 (clockwise as viewed in FIG. 2) to engage the front scraper blade 18a with the ground. Conversely, rearward movement of the tractor (toward the left in FIG. 2) causes the scraper to tilt downward or counter-clockwise to engage the rear scraper blade 17a for back-filling as shown in FIG. 8. This automatic change of tilt upon forward and reverse operation of the tractor substantially increases the operating efficiency and capacity of the scraper.

For smoothing operation, the latch pin 64 is rotated 90 degrees from the FIG. 8 position to extend into the rear aperture 57 to fix the position of guide bar 54 in the extended position of FIG. 8 so that the maximum weight is applied to the rear blade 17a. Guide bar 54 may be pinned in the short position (as shown in FIG. 2) in which bracket 43 is held against the forward stop plate 55 when the scarifier is in its operative position and it is desired to operate the scarifier at its maximum depth.

The higher position of lower links 8 and top link 6 due to the counter-clockwise rotation of the bowl during back-filling lowers the convergence point of the forces acting through links 6 and 8 (FIG. 7). As a result, there is less upward force on the tractor rear wheels during back-filling which noticeably increases traction over conventional arrangements.

To convert from scraping operation to scarifying, the scraper 15 is dropped onto the ground by releasing the hydraulic pressure acting on lower links 8. The operator then releases latching member 70 from plate 75 by actuating lever 72 in a clockwise direction about pin 71 as viewed in FIG. 2. Since pins 36 and 37 are held in fixed position by the scraper resting on the ground, and since lower links 8 are no longer supported by the hydraulic pressure, the weight of the scarifier causes it to pivot downwardly or counter-clockwise about axis X—X of pins 36, 37 and 39 until plate 75 engages latching member 70 as shown in FIGS. 1 and 4, or until teeth 22 strike the ground. In the latter case, the soil resistance acting against the rear of teeth 22 upon reverse movement of the tractor causes the scarifier to snap into its locked, operative position. With the scraper lowered onto a curb or otherwise supported high enough to let the teeth swing free, the scarifier may swing to its full operating position under its own weight.

In summary, the scarifier 14 is held in either idle or working position by latch 70 in engagement with portions 77 or 74, respectively, of plate 75. By merely releasing latch 70 and raising or lowering the hydraulic linkage 5, the scarifier is actuated between positions. No physical effort is required on the part of the operator other than to manipulate lever 72 and the hydraulic control levers 11 and back the tractor. The need for separate hydraulic scarifier controls or for hand actuation is eliminated by the present invention. The floating action of the scraper on guide bar 54 results in automatic tilting of the scraper upon forward and reverse movement of the tractor, and the guide bar can be selectively locked in extended or short position for smoothing and deep scarifying.

While one specific embodiment of the invention has been illustrated and described in the foregoing specification, it will be obvious to those skilled in the art that other forms may be adopted without departing from the scope and spirit of the appended claims.

I claim:

1. A multipurpose earthworking implement comprising vertically movable support means, an upright frame, a first earthworking tool pivotally connected to said frame and to said support means about separate, spaced, parallel axes, a second earthworking tool connected with said first earthworking tool about the pivotal axis between said first earthworking tool and said frame, a link pivotally connecting said second earthworking tool with said frame at a point spaced from the connection between said first earthworking tool and said frame such that the weight of the second earthworking tool biases the first earthworking tool to rotate to an inoperative position in which the second tool projects below the first tool when said tools are held above the ground by the support means, the weight of the first tool biasing the first tool to rotate from its inoperative position toward an operative position in which it projects below the second tool when the second tool rests on the ground or other support to remove its weight from the first tool, and engageable and disengageable elements on said first tool and said frame selectively engageable for locking said first tool against movement from either of its operative or inoperative positions, said interengageable elements being unconnected with each other when disengaged so as to offer no restraint to movement of the first tool relative to the frame, support means and second tool.

2. A multipurpose earthworking implement as defined in claim 1 wherein said engageable and disengageable elements include an abutment member on said frame and a locking plate on said first tool having a pair of stop portions, one of which is engageable with said abutment member when said first tool is in its operative position and the other of which is engageable with said abutment member when said first tool is in its inoperative position.

3. A multipurpose, earthworking implement including vertically movable lift means, a transversely extending scarifying tool pivotally mounted on said lift means for movement between an operative position in which the teeth of the scarifying tool project downwardly from said lift means so as to engage and penetrate the ground upon downward movement of the lift means, and an inoperative position in which the teeth of the scarifying tool are held out of engagement with the ground, a scraper pivotally connected at spaced points with the scarifying tool and lift means and movable by said lift means between an operative, earthworking position and an inoperative position supported above the ground by said lift means, said scraper being pivotally connected to the scarifying tool about an axis spaced from the axis of the pivotal connection between the scarifying tool and lift means such that the weight of the scraper biases the scarifying tool to its operative position when the scraper is in its earthworking position to release the weight of the scraper from the scarifying tool; an abutment member carried by said lift means, a locking member carried by said scarifying tool having first and second stop portions, one of which is engageable with said abutment member when the scarifying tool is in its operative position and the other of which is engageable with said abutment member when the scarifying tool is in its inoperative position, the engagement of either of said stop portions with said abutment member restraining the scarifying tool against movement from one to the other of its operative and inoperative positions, and means for selectively disengaging said abutment member from said stop portions, said scarifying tool being operatively connected with said lift means solely at its pivotal mounting when the locking member is disengaged from said abutment member so as to be freely rotatable relative to the lift means and scraper.

4. A multipurpose earthworking implement adapted to be mounted on a tractor three point hitch or similar support means comprising: a frame, a scarifying tool pivotally mounted on the frame for movement between an operative, earthworking position and an inoperative position supported above the ground, means on the scarifying tool for connecting the scarifying tool to the support means about an axis spaced from the pivotal axis between the scarifying tool and the frame, a scraper connected to the scarifying tool about a pivotal axis coaxial with the pivotal axis between the scarifying tool and frame, means connecting the scraper to the frame at a point spaced from the pivotal connection between the scarifying tool and frame such that the weight of said scraper biases the scarifying tool toward its inoperative position when the implement is supported above the ground by the support means and the weight of the scarifying tool biases the scarifying tool toward its operative position when the scraper rests on the ground, an abutment member mounted on the frame, and locking means on the scarifying tool including a pair of stop portions selectively and alternately engageable and disengageable with said abutment member to restrain the scarifying tool in either its operative or inoperative positions, said scarifying tool being freely rotatable relative to the frame when said stop portions are disengaged from said abutment member.

5. In combination with a tractor having a three point hitch including a top link and a pair of lower draft links with hydraulic lift means for raising and lowering the lower links; a multipurpose earthworking implement including a transverse scraper having a pair of side panels extending forwardly from its ends, an upright frame pivotally connected near its upper end with said top link, a stabilizing link having one end connected with the scraper and its other end pivotally connected with said frame, a toothed, transverse scarifying tool pivotally connected with said side panels and the lower end of said frame on a common axis and pivotally connected with the lower links on an axis spaced from said common axis between the frame and side panels such that the scarifying tool is movable between an operative, earthworking position in which the teeth thereof project below the scraper and an inoperative position in which the scraper projects below the teeth of the scarifying tool and is biased by the weight of the scraper toward its inoperative position when the scraper is supported above the ground by the tractor hitch, and is biased by its own weight toward its operative position when the scraper is lowered onto the ground to remove its weight from the scarifying tool, and means on said frame selectively engageable with said scarifying tool in either of its operative and inoperative positions to restrain the scarifying tool against pivotal movement, said means being selectively disengageable from the scarifying tool to permit free movement of the scarifying tool between its operative and inoperative positions in response to raising and lowering of the tractor hitch links, the pivotal connections between said frame and scarifying tool and between said scarifying tool and the lower hitch links being the sole connection between the scarifying tool, hitch links and frame when said means is disengaged therefrom.

References Cited by the Examiner

UNITED STATES PATENTS

| | | | |
|---|---|---|---|
| 2,100,856 | 11/1937 | Killefer | 172—683 X |
| 2,698,492 | 1/1955 | Justice | 37—145 |
| 2,839,851 | 6/1958 | Geiszler | 172—197 X |
| 2,919,143 | 12/1959 | Garner | 172—449 |
| 2,986,828 | 6/1961 | Lapins et al. | 37—145 |
| 3,069,791 | 12/1962 | French | 37—145 |

ANTONIO F. GUIDA, *Primary Examiner.*

ABRAHAM G. STONE, J. R. OAKS,
*Assistant Examiners.*